United States Patent [19]
Gill et al.

[11] Patent Number: 5,554,422
[45] Date of Patent: Sep. 10, 1996

[54] MANUFACTURING OF CONTAINERS

[75] Inventors: David C. Gill, Keynsham; Garry K. Pressey, Mangotsfield, both of United Kingdom

[73] Assignee: Nomix Manufacturing Company, Ltd., United Kingdom

[21] Appl. No.: 847,418

[22] Filed: Mar. 5, 1992

Related U.S. Application Data

[63] Continuation of Ser. No. 525,492, May 18, 1990, abandoned.

[30] Foreign Application Priority Data

May 26, 1989 [GB] United Kingdom ............... 8912224

[51] Int. Cl.$^6$ ..................................... B65B 3/00
[52] U.S. Cl. ................ 428/34.3; 428/34.1; 428/35.2; 156/69; 156/214; 156/499; 264/248; 264/545; 264/292; 264/294; 425/508; 425/509; 425/515; 53/453; 53/444; 53/474
[58] Field of Search ................... 156/69, 274, 499; 264/248, 545, 292, 294; 425/508, 509, 515; 53/453, 449, 494; 428/34.1, 34.3, 36.2

[56] References Cited

U.S. PATENT DOCUMENTS

| | | |
|---|---|---|
| 2,321,836 | 6/1943 | Marzo . |
| 3,801,402 | 4/1974 | Suter . |
| 4,152,184 | 5/1979 | Bacehowski ........................ 264/248 |
| 4,257,530 | 3/1981 | Faller . |
| 4,356,053 | 10/1982 | LoMaglio ........................ 156/499 |
| 4,394,204 | 7/1983 | Hutchenson ..................... 154/499 |
| 4,427,476 | 1/1984 | Beck et al. ........................ 264/248 |
| 4,543,770 | 10/1985 | Walter et al. . |
| 4,603,541 | 8/1986 | Medwed . |
| 4,684,025 | 8/1987 | Copland et al. . |
| 4,685,274 | 8/1987 | Garwood . |
| 4,796,408 | 1/1989 | Mobard . |

FOREIGN PATENT DOCUMENTS

| | | |
|---|---|---|
| 0068718 | 1/1983 | European Pat. Off. . |
| 0194871 | 9/1986 | European Pat. Off. . |
| 0219758 | 4/1987 | European Pat. Off. . |
| 857786 | 11/1961 | United Kingdom . |
| 1075221 | 7/1967 | United Kingdom . |
| 1434967 | 5/1976 | United Kingdom . |
| 1472178 | 5/1977 | United Kingdom . |
| 2001934 | 2/1979 | United Kingdom . |
| 2041318 | 9/1980 | United Kingdom . |
| 1586437 | 3/1981 | United Kingdom . |
| 2136321 | 9/1984 | United Kingdom . |
| 2171383 | 8/1986 | United Kingdom . |
| 2207032 | 1/1989 | United Kingdom . |
| 2111939 | 7/1989 | United Kingdom . |
| 2215705 | 9/1989 | United Kingdom . |
| 2207110 | 11/1989 | United Kingdom . |
| WO/8501269 | 3/1985 | WIPO . |

*Primary Examiner*—Patrick J. Ryan
*Assistant Examiner*—Merrick Dixon
*Attorney, Agent, or Firm*—Merchant, Gould, Smith, Edell, Welter & Schmidt, P.A.

[57] ABSTRACT

At a first station 202, flexible material 204 is deformed into a predetermined configuration defined by a mould recess 210. This configuration corresponds to the internal configuration of one of two housing parts 136, 138, situated at a second station 206. The deformed region of the flexible material 204 is advanced to the second station and secured between the housing parts 136, 138, to form a flexible partition within the container so formed.

6 Claims, 3 Drawing Sheets

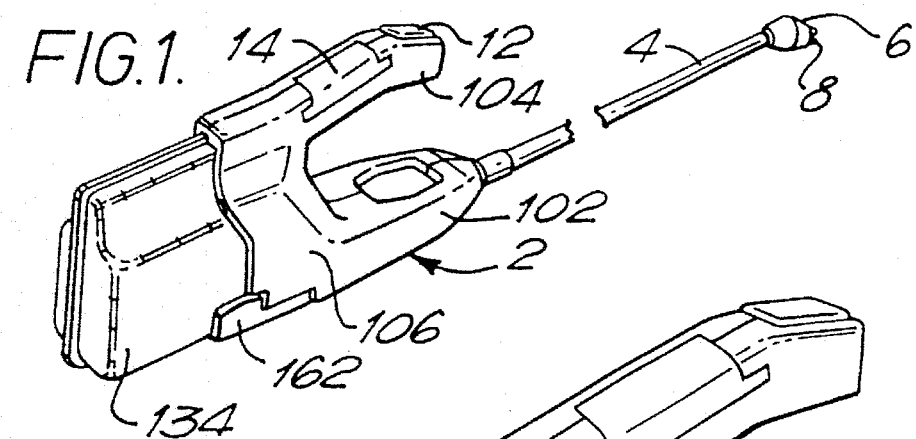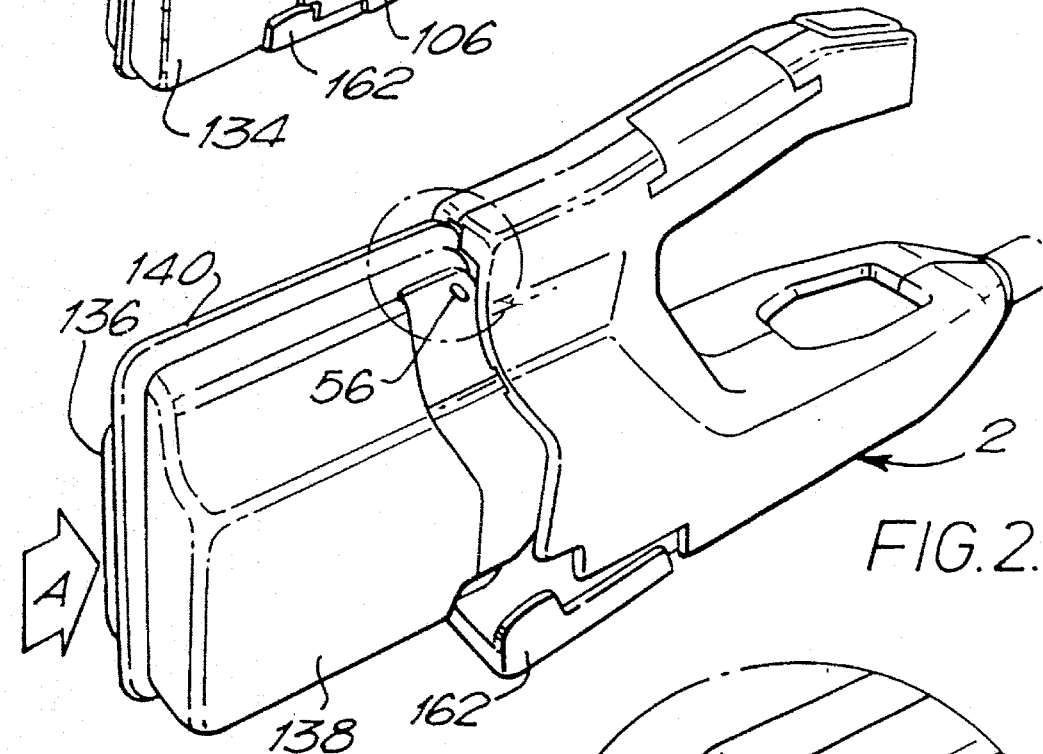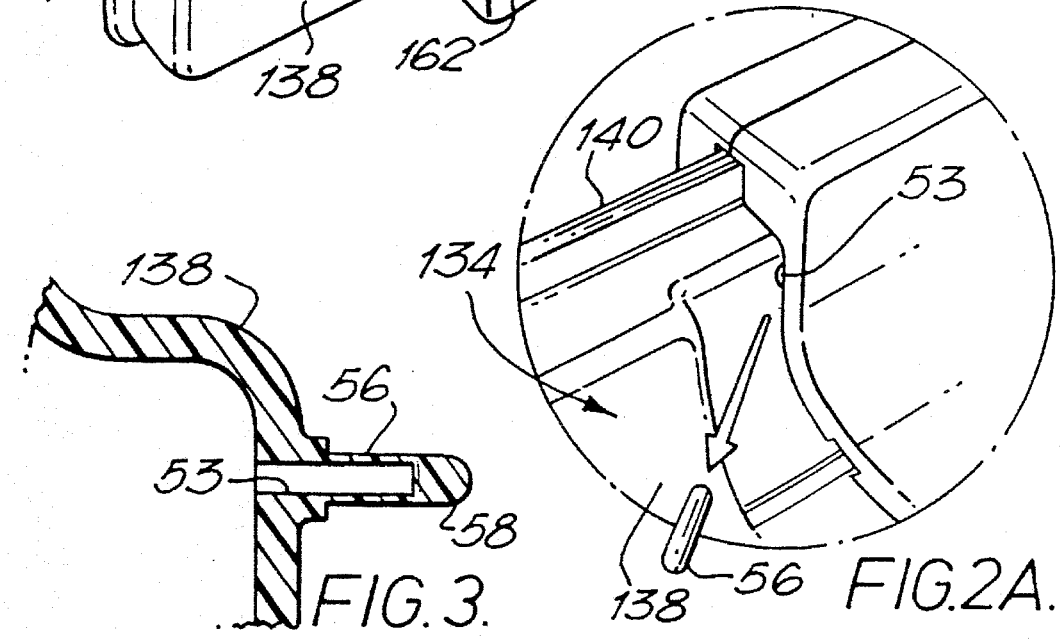

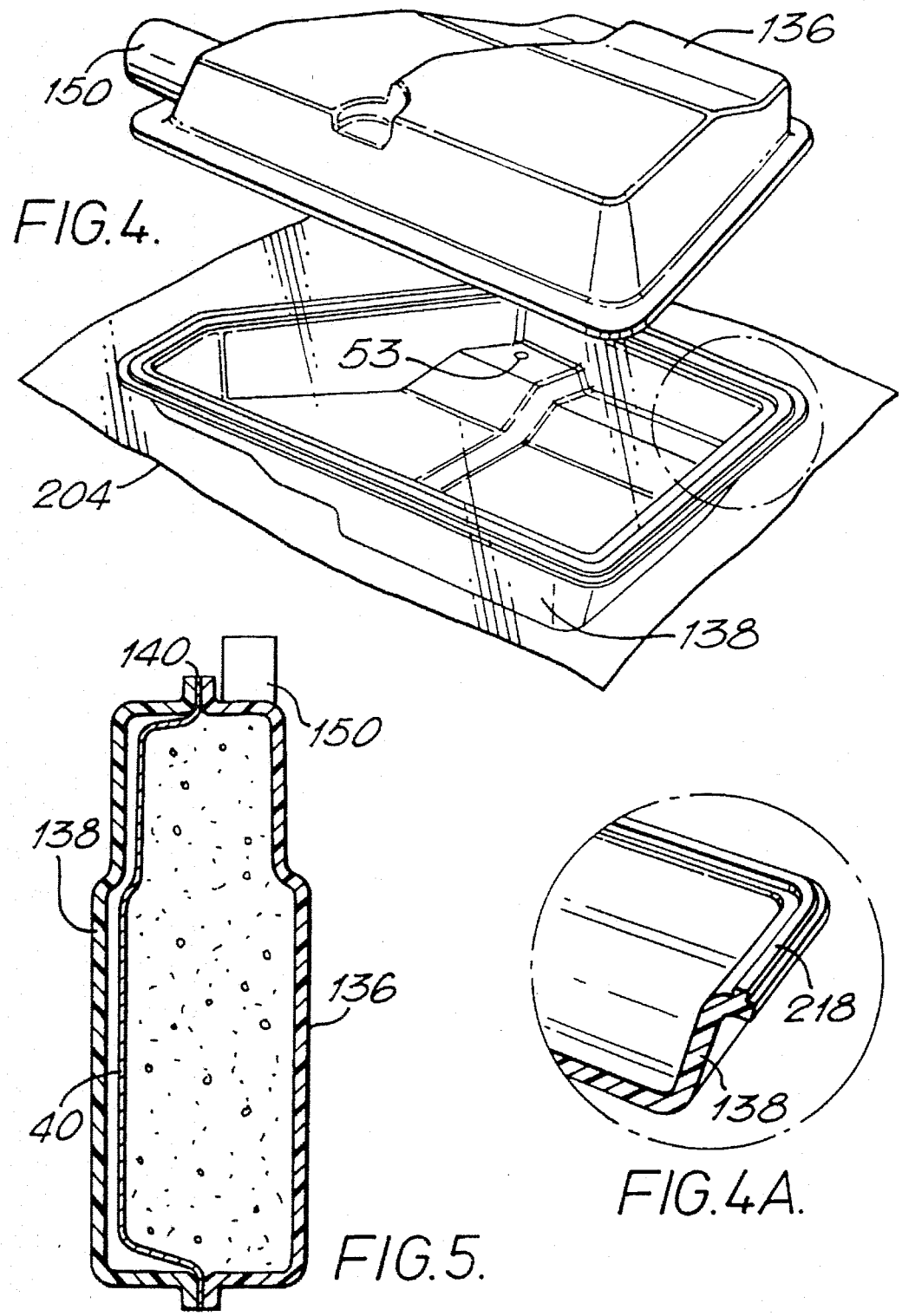

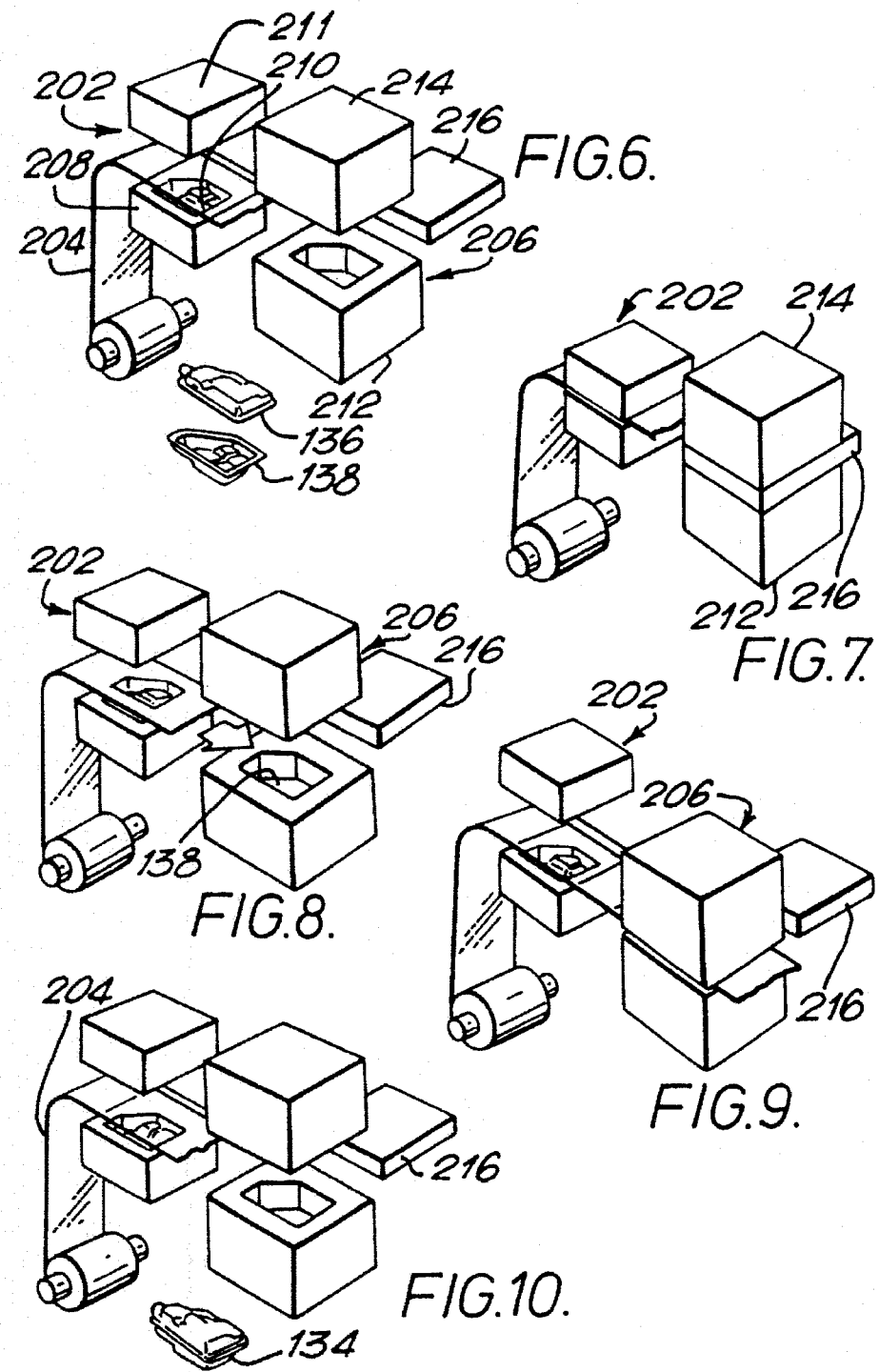

MANUFACTURING OF CONTAINERS

This is a continuation, of application Ser. No. 07/525,492, filed May 18, 1990, now abandoned.

This invention relates to the manufacture of containers and is particularly, although not exclusively, concerned with the manufacture of containers for liquids such as herbicides.

European patent specification No. 0333476 discloses processes for manufacuring containers which are divided internally by a flexible partition into two compartments. In those processes, the flexible wall is deformed into a predetermined configuration after it has been secured to a peripheral edge of a rigid housing part of the container.

A disadvantage of these processes is that the production of the containers is slowed down by the need to perform two operations at the forming station, namely the securing of the flexible material to the rigid housing part and the deformation of the film. Also, since the flexible material is secured to the rigid housing part in an airtight manner, the rigid housing part must be perforated in some way to allow the flexible material to be deformed. Such perforation is not always desirable.

According to the present invention, there is provided a method of manufacturing a container comprising a rigid housing, formed from two housing parts, the interior of the housing being divided into two compartments by a partition of flexible material, the method comprising:

a) permanently deforming a region of the flexible material, at a first station, into a predetermined configuration corresponding to the internal configuration of one of the housing parts;

b) displacing the deformed region of the flexible material to a second station, at which the housing parts are situated, and placing the deformed region into registering contact with the internal surface of the said one housing part; and c) bringing the housing parts into engagement with each other and securing them together to form the housing with the flexible material disclosed between them.

For a better understanding of the present invention, and to show how it may be carried into effect, reference will now be made, by way of example, to the accompanying drawings, in which:

FIG. 1 shows a lance for delivering herbicide, fitted with a container of herbicide;

FIG. 2 is an enlarged view of a handset of the lance of FIG. 1, showing the container partially fitted;

FIG. 2A is an enlarged fragmentary view of the junction between the handset and the container;

FIG. 3 is an enlarged sectional view of part of the wall of the container;

FIG. 4 is a diagrammatic exploded view of the container;

FIG. 4A is an enlarged view of part of the container shown in FIG. 4;

FIG. 5 is a sectional view of the filled container;

FIGS. 6 to 10 show different stages in the manufacture of the container of FIGS. 4, 4A and 5.

The lance shown in FIG. 1 comprises a handset 2 from which extends a rigid support member in the form of a tube 4. The tube 4 carries a delivery device in the form of a spraying head 6 which accommodates an electric motor (not shown) for driving a distribution element 8 in the form of a spinning disc.

A duct (not shown) extends from the handset 2 through the tube 4 to the spraying head 6. The handset 2 is provided with a valve (not shown) which can be operated by means of a trigger 12. A battery providing the source of power for the motor in the head 6 is accommodated in the handset 2, for example in a compartment 14 at the forward end of the handset.

The handset 2 comprises a somewhat U-shaped body made up of a first limb 102, which receives the tube 4, a second limb 104, which constitutes a handle member, and a connecting portion 106. The duct 10 enters the limb 102 and is connected to the outlet of the valve.

The connection portion 106 has a cavity which is occupied by the forward portion of a container 134 of herbicide. The rearward part of the container 134 projects from the cavity. The container comprises two casing halves 136 and 138 which adjoin one another at a seam 140. The two casing halves 136, 138 are substantially mirror images of one another, and so the container as a whole is generally symmetrical about the seam 140.

A flexible partition 40 (FIG. 5) extends between the casing halves 136 and 138, being secured to these casing halves at the seam 140. The interior of the container is thus divided into two compartments, one of which is defined between the flexible partition and the casing half 136, and the other of which is defined between the flexible partition and the casing half 138.

The casing half 136 is provided with an outlet fitting 150 which, when the container is fitted to the handset, engages an inlet fitting provided within the cavity so as to enable herbicide to flow from the container to the valve and hence to the head 8.

The casing half 138 is provided with a vent hole 53 (FIG. 3). The vent hole 53 is positioned on the casing half 138 so that, when the container is fitted to the handset 2, it is within the cavity. Before the container is first used, the vent hole 53 is enclosed, at the outside of the container, within a rigid tubular projection 56 formed on the casing half 138. The projection 56 has a closed end 58, so that the compartment defined between the flexible partition and the casing half 138 is wholly sealed from the surroundings.

The handset is provided with latching means in the form of a lever 162. This lever is freely pivoted, to the portion 102 of the handset. When the container 134 is inserted into the cavity, the lever engages within recesses in the container to retain the container 134 within the cavity.

For operation, the container 134 is inserted into the cavity in the direction of the arrow A in FIG. 2. During the initial stage of this insertion movement, the lever 162 is pivoted downwardly, for example under its own weight, as shown in FIG. 2.

As the container enters the cavity, the projection 56 engages the edge of the cavity and is broken off, to expose the vent hole 53, as shown in FIG. 2A. When the container 134 is pushed fully home, the lever 162 engages the container 134, as shown in FIG. 1, to retain the container firmly in the handset.

In operation, with the container 134 fitted to the handset 2, the lance is carried by an operator, by means of the handle member 104, with the spraying head 6 close to the ground. Actuation of the trigger 12 opens the valve in the limb 102 to allow herbicide to flow from the container 134 down a supply duct in the tube 4, to the spraying disc 8, so as to be distributed over the ground. As well as opening the valve, actuation of the trigger 12 also connects the motor in the head 6 to the battery in the limb 102 of the handset 2, so as to rotate the spraying disc 8.

As herbicide flows from the container 134, the flexible partition 40 deflects so as to reduce the size of the compartment in which the herbicide is accommodated, and to increase the size of the other compartment. To allow this to happen, air enters the compartment between the casing half 138 and the partition 40 through the vent hole 53.

It will be appreciated that, before the container 134 is first used, the projection 56 prevents any communication between the ambient surroundings and the compartment between the flexible partition 40 and the casing half 138. It sometimes happens that the flexible partition 40 may be defective, for example it may be punctured or inadequately sealed at its edges to the casing halves 136 and 138. In such circumstances, herbicide can flow across the partition 40 into the compartment which should contain only air. If the vent hole 53 were open in such circumstances, herbicide could leak from the container, which would be undesirable for several reasons. The provision of the projection 56 to seal the vent hole 53 thus avoids any possibility of leakage in this manner in the period between manufacture and filling of the container and its first use in distribution equipment.

It will be appreciated that, in some applications, it may be appropriate for the projection 56 to be broken off manually before the container is connected to delivery equipment, rather than being automatically broken off as the container is inserted, as shown in FIG. 2A.

FIGS. 6 to 10 illustrate a process for manufacturing the container 134. The equipment for manufacturing the containers comprises a vacuum forming station 202 for forming a plastics film 204 to create the partition 40. There is also a welding station 206 for welding together the two casing halves 136 and 138, with the formed film 204 between them.

As shown in FIG. 6, the film is conveyed over a vacuum forming mould 208 at the moulding station 202. The mould 208 has a recess 210 which corresponds to the internal configuration of the casing half 138. A heater block 211 is lowered onto the mould 208, the film 204 is heated and drawn under vacuum into the cavity 210. At the same time, the casing halves 136 and 138 are positioned within respective supports 212 and 214, and a heater block 216 is introduced between them. The supports 212 and 214 are moved towards each other into contact with the heater block 216, in order to melt a peripheral bead 218 on each casing half 136, 138 (see FIG. 4A).

Subsequently, as shown in FIG. 8, the supports 212 and 214 are moved apart, and the heater block 216 is retracted. The film 204, with the formed region is advanced until the formed region is positioned in the correct place between the casing halves 136 and 138 in the supports 212 and 214, and in contact with the internal surface of the casing half 138. Then, as shown in FIG. 9, the supports 212 and 214 are moved together again so that the film 204 is clamped between, and welded to, the casing halves 136 and 138. Finally, the supports 212 and 214 are moved apart and the completed container 134 is discharged. Means may be provided for trimming away any of the film 204 extending outside the formed container.

It will be appreciated that the above described process operates continuously, with each pair of container halves 136 and 138 being welded together at the same time as the next following region of film 204 is being formed.

At the stage shown in FIG. 9, it will be appreciated that the formed film 204 must first be positioned substantially in contact with the inner surface of the casing half 138 since, after welding, it will not be possible to deflect the partition 40 because the vent hole 53 is closed. Consequently, to fill the container after it is formed, it is necessary to vent through the inlet fitting 150.

We claim:

1. A method of manufacturing a filled container comprising a rigid housing, formed from rigid first and second housing parts, the interior of the housing being divided into two compartments by a partition of flexible material, the first housing part having an outlet aperture which communicates with one of the compartments, the method comprising the steps recited below, in the order listed:

(a) permanently deforming a region of the flexible material, at a first station, into a predetermined configuration corresponding to the internal configuration of the second housing part;

(b) displacing the deformed region of the flexible material to a second station, at which the housing parts are situated, and placing the deformed region into registering contact with the internal surface of the second housing part;

(c) bringing the first and second housing parts into engagement with each other to form the housing with the partition of flexible material disposed between them;

(d) sealing the first and second housing parts and the partition of flexible material together along a periphery of the same, whereby the partition can be displaced within the container to alter the volume of the two compartments formed therein; and (e) filling the container by introducing liquid through the outlet aperture into the compartment defined between the partition and the first housing part, that compartment being vented through the outlet aperture.

2. A method as claimed in claim 1, in which the flexible material is in the form of a web, and is displaced by advancing the web.

3. A method as claimed in claim 1, the housing parts and the flexible material being made of plastics material, in which, before the deformed region is displaced to the second station, the housing parts are heated to soften the plastics material so that, in step (c), the housing parts are secured together by welding.

4. A method as claimed in claim 3, in which the housing parts are heated by a heating element disposed between them.

5. A method as claimed in claim 1, in which, while step (c) is being performed at the second station during the manufacture of one container, step (a) is being performed at the first station in the manufacture of a subsequent container.

6. A method as claimed in claim 1, in which the said second housing part includes a vent hole which is closed by a removable closure element.

* * * * *